O. M. FREDD.
VULCANIZING MOLD.
APPLICATION FILED DEC. 28, 1920.
1,376,196.
Patented Apr. 26, 1921.
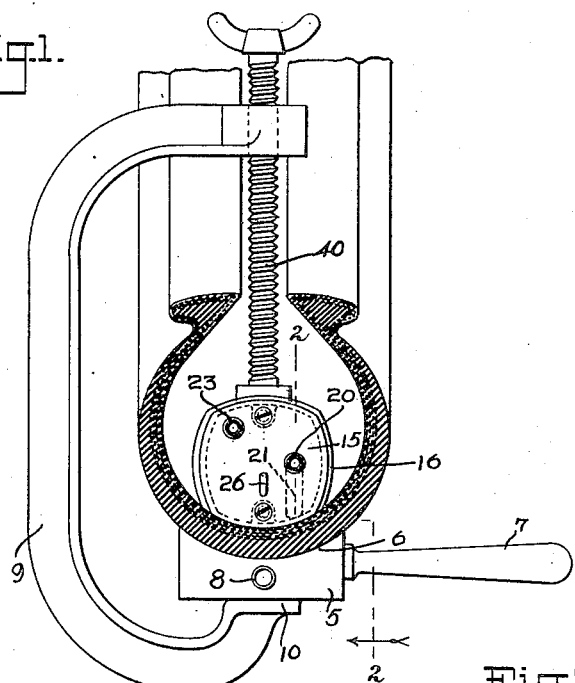
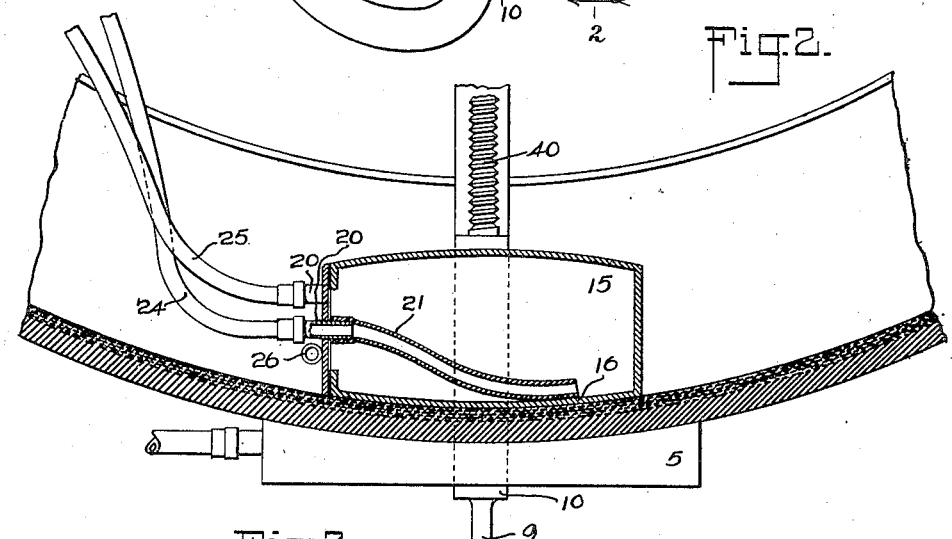
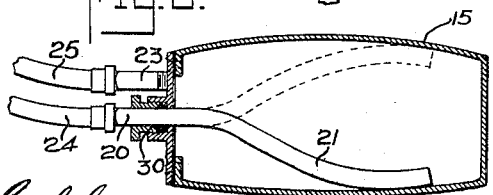
WITNESSES
William P. Goebel.
P. H. Pattison.
INVENTOR
O. M. FREDD
BY Munn&Co
ATTORNEYS

UNITED STATES PATENT OFFICE.

OSCAR M. FREDD, OF HANCOCK, MICHIGAN.

VULCANIZING-MOLD.

1,376,196.          Specification of Letters Patent.     Patented Apr. 26, 1921.

Application filed December 28, 1920. Serial No. 433,644.

*To all whom it may concern:*

Be it known that I, OSCAR M. FREDD, a citizen of the United States, and a resident of Hancock, in the county of Houghton and State of Michigan, have invented new and Improved Vulcanizing-Molds, of which the following is a full, clear, and exact description.

The present invention relates to new and useful improvements in repair devices for tires, and it pertains more particularly to the vulcanizing mold therefor.

It is one of the primary objects of the present invention to provide a device of this character, which is capable of use with tires of different dimensions.

In the vulcanizing of tires as ordinarily practised, the portion vulcanized is generally heated upon but one side or face thereof, and it is a further object of the present invention to apply the heat to the portion to be vulcanized at opposite sides thereof in order that the localization of the heat may be more effectively carried out.

A further object of the invention is to provide a device of this character in which the heating medium used is steam.

It is a further object of the invention to so construct a device of this character that the water of condensation may be properly carried off from within the heating chamber.

With the above and other objects in view, reference is had to the accompanying drawings, in which—

Figure 1 is a sectional view showing the manner of use of the present device;

Fig. 2 is a sectional view taken on the line 2—2 of Fig. 1;

Fig. 3 is a modified form of the invention.

Referring more particularly to the drawings, the reference character 5 designates an ordinary mold commonly employed in the practice of vulcanizing tires, and said mold is provided with a curved face 6 adapted to receive the tire and a handle 7 by means of which the mold may be manipulated. The mold is generally formed of a hollow structure and steam or other suitable medium is introduced thereto through the inlet opening 8. The reference character 9 designates a U-shaped clamp, and the foot 10 of said clamp is adapted to engage beneath the mold 5, as more clearly shown in Figs. 1 and 2.

The reference character 15 designates an internal mold and said internal mold forms the essence of the present invention. As more clearly shown in Fig. 1, this internal mold is substantially rectangular in cross-sectional form, and each of its side walls 16 is arranged at a different angle from the remainder of the side walls in order that the proper curvature may be obtained for tires of different dimensions. Leading into the end of the device at a point approximately central thereof, is a nipple 20, and in the preferred form of the invention, a flexible tube 21 is secured to the nipple 20, said tube 21 occupying a position internally of the member 15. Leading into the member 15, near one of its side edges, is a nipple 23, and said nipple 23 is adapted to communicate with the interior of the member 15. Connected to the nipples 20 and 23, are flexible pipes 24 and 25, respectively. The pipe 25 serves the means by which the heating medium is conveyed to the interior of the member 15, and the pipe 25 forms the means by which the water of condensation is withdrawn from the member 15. This end of the member 15 is provided with a suitable eye 26, which may be engaged by means of a hook to provide for proper manipulation of the member 15 within the tire.

In the form of the invention shown in Fig. 3, the drain pipe 21 instead of being formed of flexible material is preferably rigid and is bent in order that it may engage the bottom wall, and said drain pipe 21 is swivelingly mounted in a stuffing gland 30 in order that it may be moved to any of the side walls which may be positioned at the bottom as indicated by dotted lines in said figure.

The device is used in the following manner:

When it is desired to carry out the vulcanizing operation, the mold 5 is placed exteriorly of the casing with the member 5 interior thereof. The clamp is now positioned and its threaded member 40 is moved into engagement with the member 15 in order that the material operated upon may be securely clamped between the mold 5 and the member 15. The heating medium is now permitted to flow to the interior of the member 15 and as the mold heats up, it will be seen that the heat thereof will be transmitted to the material operated upon.

By this construction it will be seen that the invention provides a means whereby the heat applied to the tire to be vulcanized is localized, and that the portion of the tire treated may be heated through from opposite sides, thus insuring a sufficient amount of heat being employed to properly carry out the vulcanizing operation.

I claim:

1. In combination with a vulcanizing mold, a reversible heating element adapted to be placed in opposition to the mold and to clamp the material operated upon between the heating element and the mold.

2. In combination with a mold for vulcanizing tires, a reversible heating element adapted to be arranged in opposition to said mold and positioned interiorly of the tire, means for supplying a heating medium to said heating element, and means for compressing the tire operated upon between the mold and the heating element.

3. In combination with a tire-vulcanizing mold, a reversible heating element adapted to be arranged in opposition to the mold and interiorly of the tire, means for conveying steam to said heating element to heat the same, and universally adjustable means for withdrawing the water of condensation from the interior of said heating element.

4. A device of the character described comprising a reversible hollow member of substantially rectangular form, the several side walls of which are curved to different angles, to adapt the device for use with tires of different dimensions, means for conveying steam to the interior of said member to heat the same, and universally adjustable means mounted within the member for conveying the water of condensation therefrom.

OSCAR M. FREDD.